United States Patent
Kalam

(10) Patent No.: US 11,984,940 B2
(45) Date of Patent: May 14, 2024

(54) SYSTEMS AND METHODS FOR TRANSMITTING WI-FI SIGNALS OVER A CO-AXIAL RADIO FREQUENCY (RF) CABLE

(71) Applicant: DISH Technologies L.L.C., Englewood, CO (US)

(72) Inventor: Arun Pulasseri Kalam, Karnataka (IN)

(73) Assignee: DISH Technologies L.L.C., Englewood, CO (US)

( * ) Notice: Subject to any disclaimer, the term of this patent is extended or adjusted under 35 U.S.C. 154(b) by 8 days.

(21) Appl. No.: 17/867,152

(22) Filed: Jul. 18, 2022

(65) Prior Publication Data

US 2023/0283321 A1 Sep. 7, 2023

(30) Foreign Application Priority Data

Mar. 1, 2022 (IN) .............................. 202241011038

(51) Int. Cl.
*H04B 3/06* (2006.01)
*H04B 7/06* (2006.01)
*H04W 84/06* (2009.01)
*H04W 84/22* (2009.01)

(52) U.S. Cl.
CPC ................ *H04B 3/06* (2013.01); *H04B 7/06* (2013.01); *H04W 84/06* (2013.01); *H04W 84/22* (2013.01)

(58) Field of Classification Search
CPC .............................. H04W 84/22; H04W 84/06
USPC ......................................................... 375/257
See application file for complete search history.

(56) References Cited

U.S. PATENT DOCUMENTS 10,805,170 B1 * 10/2020 Sun ..................... H04L 41/0893
2004/0132403 A1 * 7/2004 Alba ...................... H04W 88/16
455/3.03

* cited by examiner

*Primary Examiner* — Leila Malek
(74) *Attorney, Agent, or Firm* — Jeremiah J. Baunach; VLP Law Group LLP

(57) ABSTRACT

A Wi-Fi mesh network uses a co-axial radio frequency (RF) cable to communicate between a central Wi-Fi mesh network node and one or more satellite Wi-Fi mesh network nodes instead of communicating wirelessly over the air between those nodes. In an example embodiment, the Wi-Fi signals are down-converted to a ~500 MHz frequency range at the central Wi-Fi mesh network node and then passed through the RF cable. At the receiving end, the down-converted signal is then up-converted back from the ~500 MHz frequency range to one of the 2.4 GHz, 5 GHz or 6 GHz frequency bands, which may then be wirelessly transmitted via Wi-Fi chipset of the satellite Wi-Fi mesh network node.

20 Claims, 6 Drawing Sheets

SYSTEMS AND METHODS FOR TRANSMITTING WI-FI SIGNALS OVER A CO-AXIAL RADIO FREQUENCY (RF) CABLE

BACKGROUND

The number of wireless devices being used is currently growing exponentially and, per one estimation, by 2025 there will be 20 billion connected wireless devices. As the number of wireless devices in homes and offices grows, the demand for better connectivity also increases.

BRIEF SUMMARY

Wireless devices often connect to each other over a Wi-Fi local area network (LAN). In one embodiment, Wi-Fi is a family of wireless network protocols, based on the IEEE 802.11 family of standards, allowing computers, smartphones, or other wireless devices to connect to the Internet or communicate with one another wirelessly within a particular area.

For better connectivity, offices and homes may use a mesh network Wi-Fi system. A mesh network is a group of devices that act as a single Wi-Fi network, so there are multiple sources of Wi-Fi around the home or office, instead of just a single Wi-Fi router. These additional Wi-Fi sources are called points or nodes. In one embodiment, a mesh network Wi-Fi system has one central Wi-Fi mesh network node and multiple wireless satellite Wi-Fi mesh network nodes placed at different locations within the home or office. For a mesh network to be more efficient, the satellite mesh node and the central mesh node need to provide high throughout, low latency communication. However, as the number of wireless connected devices increases, the interference in various forms also increases, thereby necessitating multiple re-transmissions to occur due to errors in reception. When the satellite mesh node and central mesh node are not exchanging information at high throughput, the overall performance of the Wi-Fi connection is reduced, thus affecting the customer's satisfaction level.

For example, the satellite mesh node and central mesh node may use a dedicated channel to communicate between them to decrease interference and increase throughput of the connection. In one embodiment, this channel is not used with any other devices to keep it clean as a backbone communication between the satellite mesh node and the central mesh node. Also, the satellite mesh node and central mesh node are usually kept in line of sight of each other or with very few obstacles in the path to ensure the best throughput. However, when there are many wireless connected devices in the area, it creates various forms of interference resulting intermodulation distortion and harmonic distortions which will affect the signals over air. These distortions will affect the overall performance of the satellite mesh node and central mesh node by interfering with the signal band.

To solve the above technical problems, instead of communicating over air between the satellite mesh node and the central mesh node of the mesh network Wi-Fi system, example embodiments disclosed herein use an RF cable to communicate Wi-Fi signals between the satellite mesh node and central mesh node. An advantage is that embodiments disclosed herein not only reduce interferences from other signals, but also minimize the interference to the other signals. There are few traditional technologies available to exchange data over RF cable, including those following MoCA (Multimedia over Coax) and DOCSIS (Data Over Cable Service Interface Specification) standards. MoCA uses RF cable, but the market is small and there is currently only one vendor who is building the chipset. This is not a growing technology and cannot be scaled. On the other hand, DOCSIS is an expensive solution, which is at least three times more expensive than solutions provided by the embodiments described herein.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to various communication systems and networks, have not been shown or described in order to avoid unnecessarily obscuring descriptions of the embodiments. Additionally, the various embodiments may be methods, systems, media, or devices.

Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
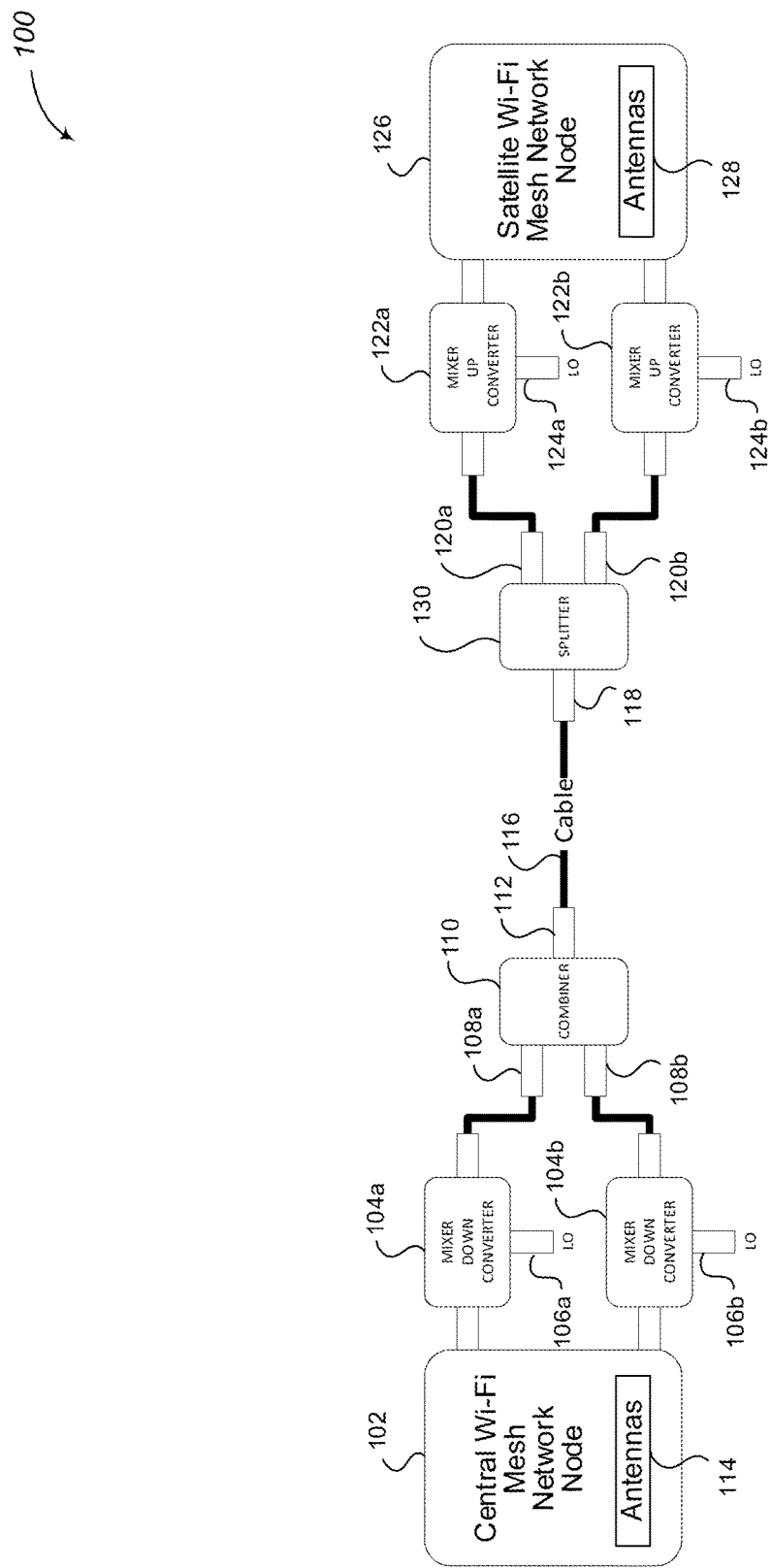
FIG. 1 is a block diagram illustrating a system for transmitting Wi-Fi signals over a co-axial RF cable in accordance with embodiments described herein.

FIG. 1 is a block diagram illustrating a system 100 for transmitting Wi-Fi signals over a co-axial RF cable in accordance with embodiments described herein.

Shown in FIG. 1 is a central Wi-Fi mesh network node 102 that is part of a Wi-Fi LAN, such as in a home, office or other location. The central Wi-Fi mesh network node 102 includes a plurality of central Wi-Fi mesh network node antennas 114 and a Wi-Fi chipset for transmitting and receiving Wi-Fi signals. The central Wi-Fi mesh network node 102 may be a node through which Internet service is provided to the LAN and may have a wired or wireless connection to, act as, or be part of: a cable modem, and Internet gateway device, a Wi-Fi or Internet router, a network firewall, an edge device, a network bridge device, or other computer network equipment that provides access to the Internet or other network external to the LAN. Also shown is a first Wi-Fi signal mixer downconverter 104a (also referred to herein as first downconverter 104a); a second Wi-Fi signal mixer downconverter 104b (also referred to herein as second downconverter 104b) and a signal combiner 110 (also referred to herein as combiner 110). In an example embodiment, each Wi-Fi signal downconverter of the plurality of Wi-Fi signal downconverters (downconverter 104a and downconverter 104b in the present example) is communicatively coupled, directly or indirectly, via a wire or circuit, to a respective central Wi-Fi mesh network node antenna of the plurality of central Wi-Fi mesh network node antennas 114. Thus, in the example embodiment, the number of central Wi-Fi mesh network node antennas 114 may be equal to the number of downconverters (two in the present example). The first downconverter 104a has a respective local oscillator (LO) 106a and the second downconverter 104b also has a respective local oscillator (LO) 106b.

The combiner 110 has a respective input from each of the first downconverter 104a and the second downconverter 104b. In particular, input 108a of combiner 110 is operably coupled, directly or indirectly, via a wire or circuit, to a respective output of downconverter 104a. Input 108b of combiner 110 is operably coupled, directly or indirectly, via a wire or circuit, to a respective output of downconverter 104b. Co-axial RF cable 116 is physically coupled directly or indirectly to the combiner 110 via a first co-axial cable connection port 112 that is configured to be operably coupled to the co-axial RF cable 116 and the combiner 110. In various embodiments, the cable 116 may be part of a pre-existing installed cable system or computer network, such as that of a cable television, satellite television, or Internet service provider, in a house, office or other location.

Wi-Fi signals use the 2.4 GHz, 5 GHz or 6 GHz radio frequency band. These frequencies cannot be directly passed through an RF cable (e.g., an RG-59 or RG-6 (standard commercial RF cable), such as RF cable 116, due to the bandwidth limitation of such RF cables. To overcome this limitation, the Wi-Fi signals are down-converted by downconverter 104a and downconverter 104b to ~500 MHz range. This down-converted signal is then easily passed through the RF cable 116 from the combiner 110 via and the first co-axial cable connection port 112. The RF cable 116 provides good isolation from external interference.

The satellite Wi-Fi mesh network node 126 shown in FIG. 1 is also part of the Wi-Fi LAN. The satellite Wi-Fi mesh network node 126 includes a plurality of satellite Wi-Fi mesh network node antennas 128 and a respective Wi-Fi chipset for transmitting and receiving Wi-Fi signals. Also shown is a first Wi-Fi signal mixer upconverter 122a (also referred to herein as first upconverter 122a); a second Wi-Fi signal mixer upconverter 122b (also referred to herein as second upconverter 122b) and a signal splitter 130 (also referred to herein as splitter 130). In an example embodiment, each Wi-Fi signal upconverter of the plurality of Wi-Fi signal upconverters (upconverter 122b and upconverter 122b in the present example) is communicatively coupled directly or indirectly via a wire or circuit to a respective satellite Wi-Fi mesh network node antenna of the plurality of satellite Wi-Fi mesh network node antennas 128. Thus, in the example embodiment, the number of satellite Wi-Fi mesh network node antennas 128 may be equal to the number of upconverters (two in the present example). The first upconverter 122a has a respective local oscillator (LO) 124a and the second upconverter 122b also has a respective local oscillator (LO) 124b.

The splitter 110 has a respective output to each of the first upconverter 122a and the second upconverter 122b. In particular, output 120a of splitter 130 is operably coupled directly or indirectly via a wire or circuit to a respective input of upconverter 122a and output 120b of splitter 130 is operably coupled directly or indirectly via a wire or circuit to a respective input of upconverter 122b. Co-axial RF cable 116 is physically coupled directly or indirectly to the splitter 130 via a second co-axial cable connection port 118 that is configured to be operably coupled to the co-axial RF cable 116 and the splitter 130.

The satellite Wi-Fi mesh network node 126 also has a Wi-Fi chipset for receiving and transmitting Wi-Fi signals. Thus, in the present example, the satellite Wi-Fi mesh network node 126 requires the signal it receives from the combiner 110 via RF cable 116 to eventually be in one of the 2.4 GHz, 5 GHz or 6 GHz frequency bands. To achieve this, the satellite Wi-Fi mesh network node 126 first receives the combined Wi-Fi computer network signal at a splitter via a second co-axial cable connection port. The splitter 130 then splits the combined Wi-Fi computer network signal into a plurality of Wi-Fi computer network signals and transmits a respective Wi-Fi computer network signal of the plurality of Wi-Fi computer network signals (two in the present example) to each of upconverter 122a and upconverter 122b. Each upconverter 122a and upconverter 122b upconverts the received respective Wi-Fi computer network signal to generate a respective up-converted Wi-Fi computer network signal. In the present example, each upconverter 122a and upconverter 122b upconverts the received respective Wi-Fi computer network signal to be in one of the 2.4 GHz, 5 GHz or 6 GHz frequency bands. However, this may vary in other embodiments according to various other Wi-Fi requirements and standards.

In an example embodiment, each upconverter 122a and upconverter 122b outputs each respective up-converted Wi-Fi computer network signal to a respective antenna of the plurality of satellite Wi-Fi mesh network node antennas 128. The satellite Wi-Fi mesh network node 126 may then wirelessly transmit each respective up-converted Wi-Fi computer network signal from the respective antenna at which the respective up-converted Wi-Fi computer network signal was received in one of the 2.4 GHz, 5 GHz or 6 GHz frequency bands. Thus the Wi-Fi chip of the satellite Wi-Fi mesh network node 126 can decode the signal information and exchange the data.

In the example embodiment, there are no other signal conversions or modifications made to the Wi-Fi signal received by the satellite Wi-Fi mesh network node 126 from the central Wi-Fi mesh network node 1202 via the RF cable 116 in order for such a Wi-Fi signal to be transmitted over RF cable 116. This not only provides better throughput, but also has the following advantages: lower cost; lower developmental time; use of the RF cable 116 as back bone for Wi-Fi network mesh nodes; better efficiency; lower interference with other Wi-Fi devices; better Wi-Fi frequency spectrum utilization (dynamic frequency selection (DFS) channels). Additionally, since the system 100 utilizes existing Wi-Fi chipset technology in the central Wi-Fi mesh network node 102 and satellite Wi-Fi mesh network node 126, the overall cost of implementation is low and it can be extended for use with any future Wi-Fi standard. Thus, since the system 100 ensures using existing Wi-Fi chipset technology in the central Wi-Fi mesh network node 102 and satellite Wi-Fi mesh network node 126, network communication is achieved with high throughput between the central Wi-Fi mesh network node 102 and satellite Wi-Fi mesh network node 126 using the RF cable 116.

Figure 2:
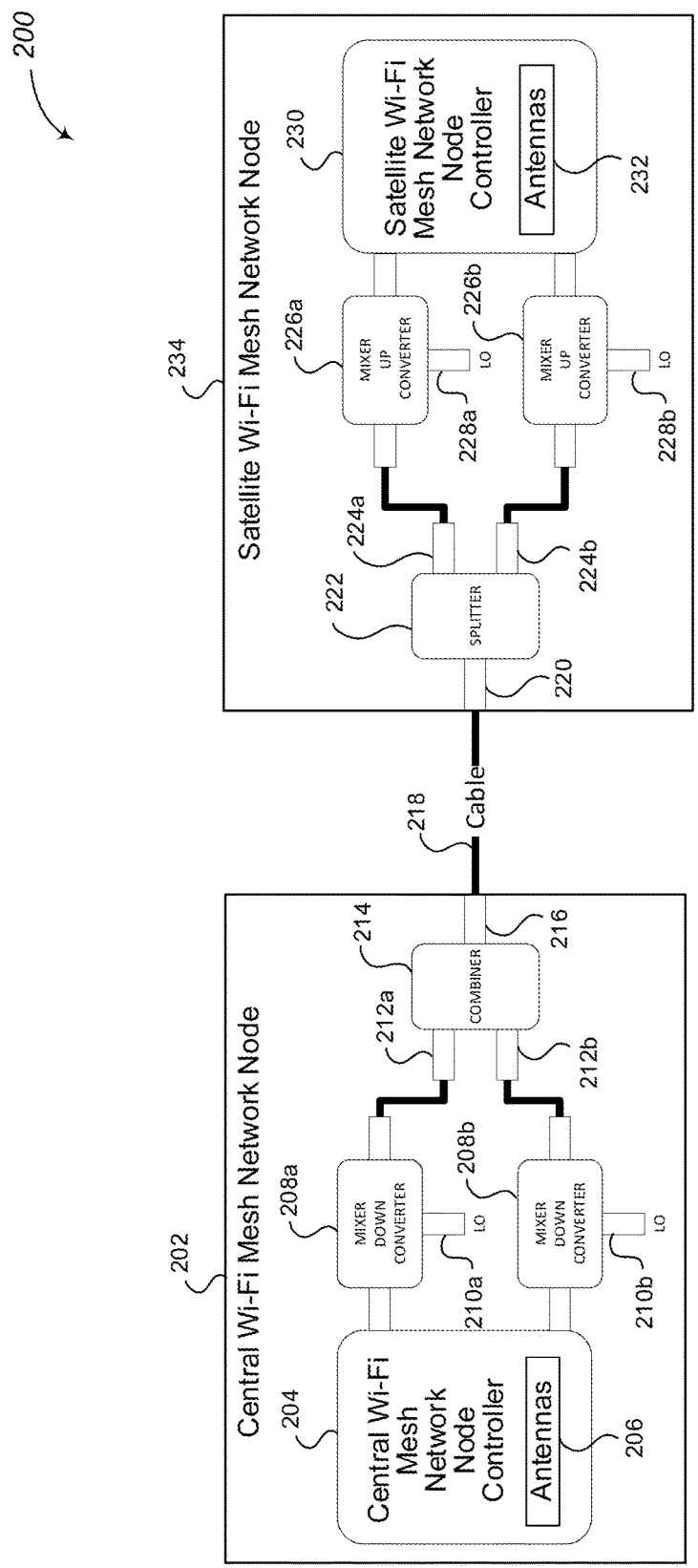
FIG. 2 is a block diagram illustrating a system for transmitting Wi-Fi signals over a co-axial RF cable in which components for doing so are in a central Wi-Fi mesh network node and a satellite Wi-Fi mesh network node, in accordance with embodiments described herein.

FIG. 2 is a block diagram illustrating a system 200 for transmitting Wi-Fi signals over a co-axial RF cable in which components for doing so are in a central Wi-Fi mesh network node and a satellite Wi-Fi mesh network node, in accordance with embodiments described herein.

In the example embodiment shown in FIG. 2, the central Wi-Fi mesh network node 202 includes inside its housing, operably coupled to each other, directly or indirectly, via a wire or circuit: a central Wi-Fi mesh network node controller 204, which includes a Wi-Fi chipset and a plurality of corresponding central Wi-Fi mesh network node antennas 206; downconverter 208a, which has LO 210a; downconverter 208b, which has LO 210b; and combiner 214, which has input 212a form the downconverter 208a and input 212b from the downconverter 208b corresponding to each antenna of the plurality of central Wi-Fi mesh network node antennas 206 and a first co-axial cable connection port 216. The first co-axial cable connection port 216 of the central Wi-Fi mesh network node 202 is configured to be operably coupled to the external co-axial RF cable 218.

Also shown is satellite Wi-Fi mesh network node 234, which includes inside its housing, operably coupled to each other, directly or indirectly, via a wire or circuit: a satellite Wi-Fi mesh network node controller 230, which includes a Wi-Fi chipset and a plurality of corresponding satellite Wi-Fi mesh network node antennas 232; upconverter 226a, which has LO 228a; upconverter 226b, which has LO 228b; and splitter 222, which has output 224a form the splitter 222 to the upconverter 226a and output 224b from the splitter 222 to the upconverter 226a, corresponding to each antenna of the plurality of satellite Wi-Fi mesh network node antennas 232, and a second co-axial cable connection port 220. The second co-axial cable connection port 220 of the satellite Wi-Fi mesh network node 234 is configured to be operably coupled to the external co-axial RF cable 218. Thus, in the present example embodiment, the RF cable 218 connects from the first co-axial cable connection port 216 of the central Wi-Fi mesh network node 202 to the second co-axial cable connection port 220 of the satellite Wi-Fi mesh network node 234. In an example embodiment, each component within the central Wi-Fi mesh network node 202 and satellite Wi-Fi mesh network node 234 performs functions equivalent to those of corresponding components shown in FIG. 1 as described herein.

Figure 3:
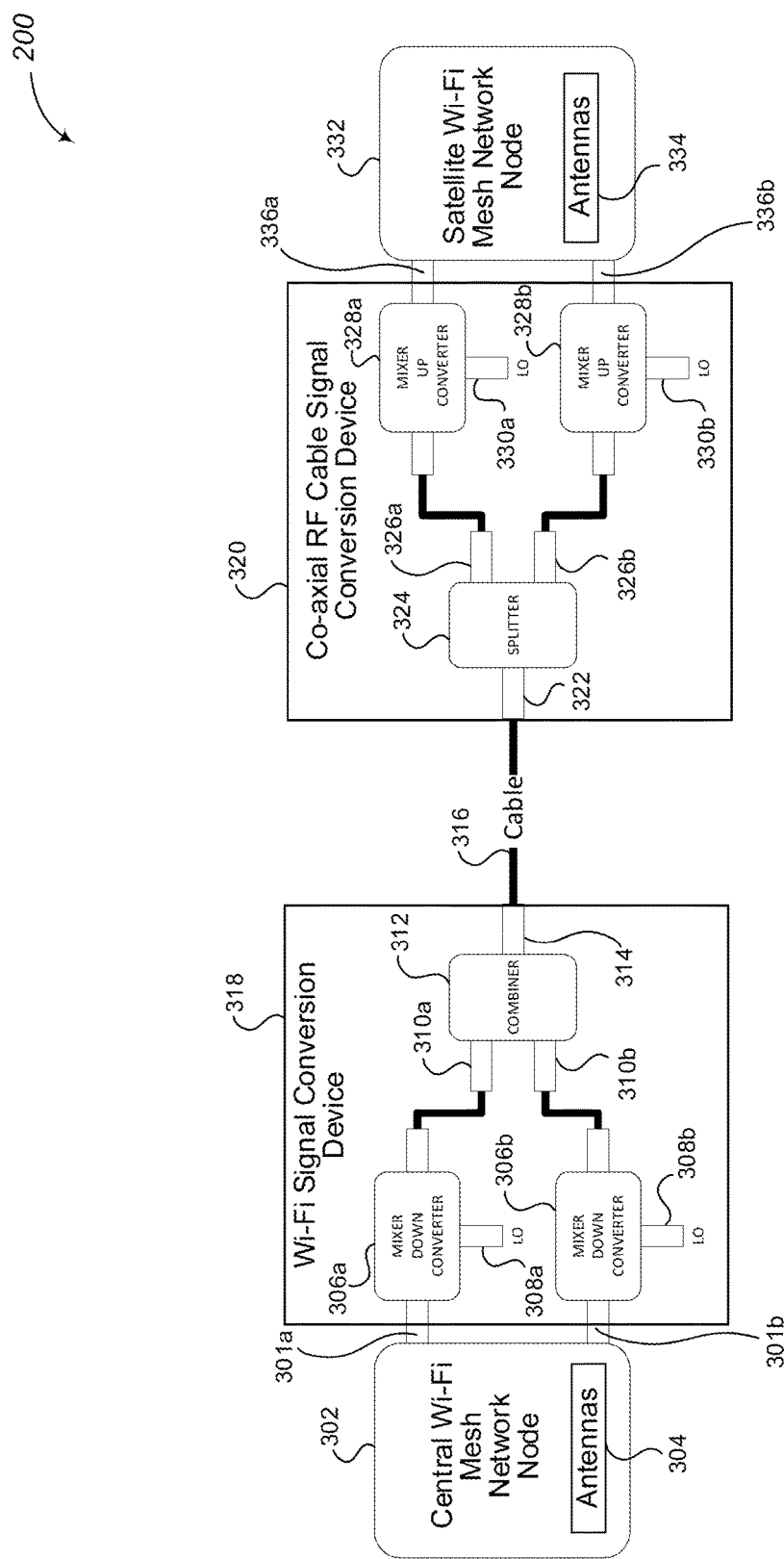
FIG. 3 is a block diagram illustrating a system for transmitting Wi-Fi signals over a co-axial RF cable in which components for doing so are in a Wi-Fi signal conversion device configured to be connected to a central Wi-Fi mesh network node and a co-axial RF signal conversion device configured to be connected to satellite Wi-Fi mesh network node, in accordance with embodiments described herein.

FIG. 3 is a block diagram illustrating a system 300 for transmitting Wi-Fi signals over a co-axial RF cable in which components for doing so are in a Wi-Fi signal conversion device 318 configured to be connected to a central Wi-Fi mesh network node 302 and a co-axial RF signal conversion device 320 configured to be connected to satellite Wi-Fi mesh network node 332, in accordance with embodiments described herein.

In the example embodiment shown in FIG. 3, shown is a central Wi-Fi mesh network node 302, which includes inside its housing, operably coupled to each other, directly or indirectly, via a wire or circuit: a Wi-Fi chipset and a plurality of corresponding central Wi-Fi mesh network node antennas 304. A separate Wi-Fi signal conversion device 318 includes inside its housing, operably coupled to each other, directly or indirectly, via a wire or circuit: one or more physical connection ports 301a and 301b configured to connect to a port of the central Wi-Fi mesh network node 302 and receive Wi-Fi signals from the central Wi-Fi mesh network node 302; downconverter 306a, which has LO 308a; downconverter 306b, which has LO 308b; and combiner 312, which has input 310a form the downconverter 306a and input 310b from the downconverter 306b, corresponding to each antenna of the plurality of central Wi-Fi mesh network node antennas 304, and a first co-axial cable connection port 314. The first co-axial cable connection port 314 of the Wi-Fi signal conversion device 318 is configured to be operably coupled to the external co-axial RF cable 316.

Also shown is satellite Wi-Fi mesh network node 332, which includes inside its housing, operably coupled to each other, directly or indirectly, via a wire or circuit: a Wi-Fi chipset and a plurality of corresponding satellite Wi-Fi mesh network node antennas 334. A separate co-axial RF cable signal conversion device 320 includes inside its housing, operably coupled to each other, directly or indirectly, via a wire or circuit: one or more physical connection ports 336a and 336b configured to connect to a port of the satellite Wi-Fi mesh network node 332 and receive Wi-Fi signals from the satellite Wi-Fi mesh network node 332; upconverter 328a, which has LO 330a; upconverter 328b, which has LO 330b; and splitter 324, which has output 326a form the splitter 324 to the upconverter 328a and output 326b from the splitter 324 to the upconverter 328b, corresponding to each antenna of the plurality of satellite Wi-Fi mesh network node antennas 334, and a second co-axial cable connection port 322. The second co-axial cable connection port 322 of the co-axial RF cable signal conversion device 320 is configured to be operably coupled to the external co-axial RF cable 316. In an example embodiment, each component within the central Wi-Fi mesh network node 302, Wi-Fi signal conversion device 318, co-axial RF cable signal conversion device 320 and satellite Wi-Fi mesh network node 332 performs functions equivalent to those of corresponding components shown in FIG. 1 as described herein.

Thus, in the present example embodiment, the central Wi-Fi mesh network node 302 and Wi-Fi signal conversion device 318 are separate devices and the satellite Wi-Fi mesh network node 332 and co-axial RF cable signal conversion device 320 are separate devices, in which the Wi-Fi signal conversion device 318 and co-axial RF cable signal conversion device 320 are portable, enabling them to be easily provided and sold separately and moved to be used on different mesh nodes on different Wi-Fi mesh networks as needed. In particular, the RF cable 316 connects from the first co-axial cable connection port 314 of the Wi-Fi signal conversion device 318 to the second co-axial cable connection port 322 of the co-axial RF cable signal conversion device 320. In some embodiments, there may be a Wi-Fi wireless connection between the central Wi-Fi mesh network node 302 and Wi-Fi signal conversion device 318 instead of a physical connection via the one or more physical connection ports 301a and 301b and/or a Wi-Fi wireless connection between the satellite Wi-Fi mesh network node 332 and co-axial RF cable signal conversion device 320 instead of a physical connection via the one or more physical connection ports 336a and 336b.

Figure 4:
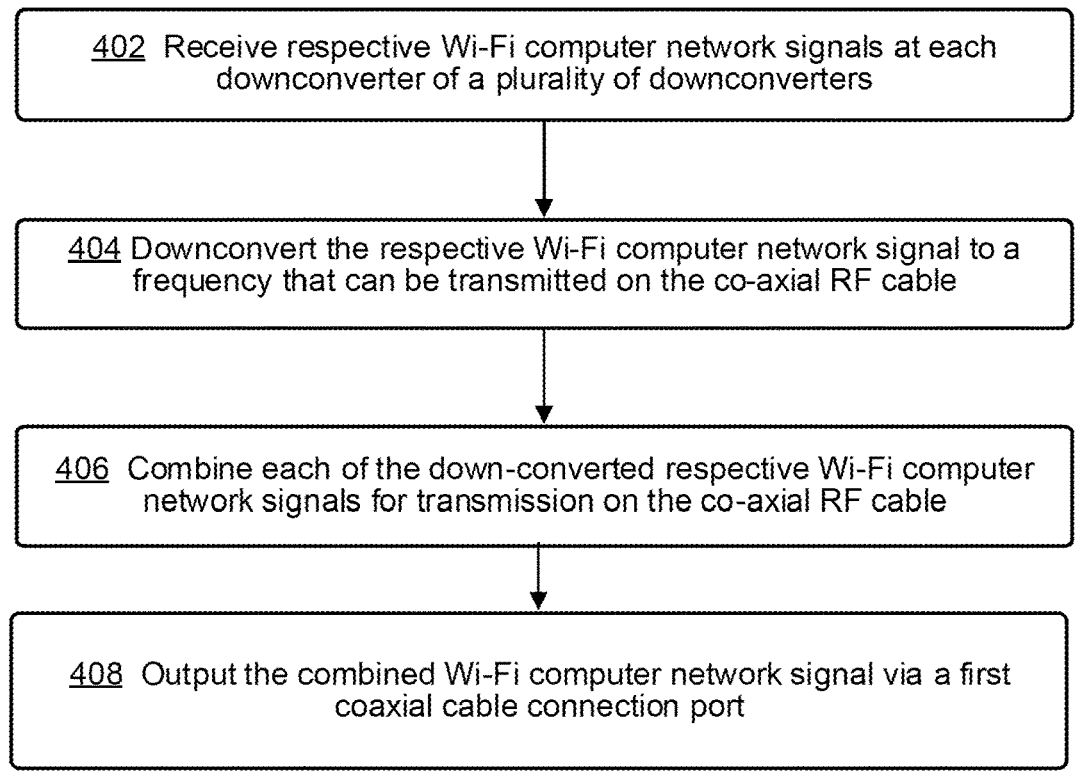
FIG. 4 illustrates a logical flow diagram illustrating a process for transmitting Wi-Fi signals over a co-axial RF cable starting with actions that occur at a central Wi-Fi mesh network node or a Wi-Fi signal conversion device configured to be connected to a central Wi-Fi mesh network node, in accordance with embodiments described herein.

FIG. 4 illustrates a logical flow diagram illustrating a process 400 for transmitting Wi-Fi signals over a co-axial RF cable starting with actions that occur at a central Wi-Fi mesh network node or a Wi-Fi signal conversion device configured to be connected to a central Wi-Fi mesh network node, in accordance with embodiments described herein.

At 402, the system 100 receives respective Wi-Fi computer network signals at each downconverter of a plurality of downconverters.

At 404, each downconverter of the plurality of downconverters downconverts the respective Wi-Fi computer network signal to a frequency that can be transmitted on the co-axial RF cable and received by a satellite Wi-Fi mesh network node of a Wi-Fi LAN via the co-axial RF cable. The system 100 may downconvert the respective Wi-Fi computer network signals to a frequency according to bandwidth limitations of the co-axial RF cable. For example, in various embodiments, the downconverters downconvert the respective Wi-Fi computer network signal from one of: 2.4 GHz, 5 GHz or 6 GHz to a frequency according to bandwidth limitations of the co-axial RF cable. In various example embodiments, the system 100 downconverts the respective Wi-Fi computer network signal to a frequency of 500 MHz, to a frequency in a range of greater than zero GHz to less than or equal to 2.1 GHz, or to a frequency in a range of greater than zero GHz to less than or equal to 3 GHz.

At 406 a combiner combines each of the down-converted respective Wi-Fi computer network signals for transmission on the co-axial RF cable as a combined Wi-Fi computer network signal to be received by the satellite Wi-Fi mesh network node via the co-axial RF cable.

At 408, the system 100 outputs the combined Wi-Fi computer network signal via a first coaxial cable connection port to be received by the satellite Wi-Fi mesh network node via the co-axial RF cable.

Figure 5:
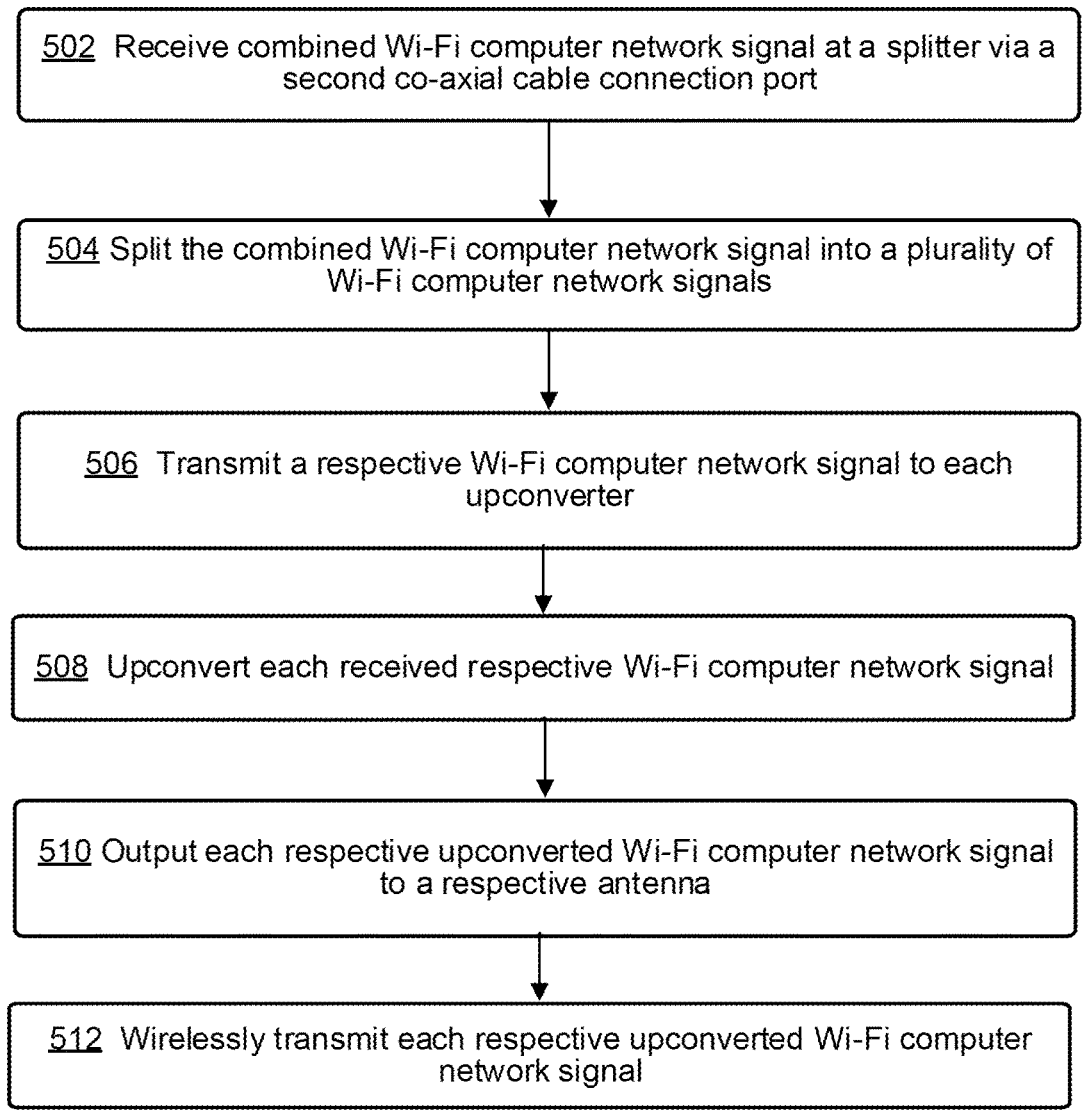
FIG. 5 illustrates a logical flow diagram illustrating a process for transmitting Wi-Fi signals over a co-axial RF cable starting with actions that occur at a satellite Wi-Fi mesh network node or a co-axial RF signal conversion device configured to be connected to satellite Wi-Fi mesh network node, in accordance with embodiments described herein.

FIG. 5 illustrates a logical flow diagram illustrating a process 500 for transmitting Wi-Fi signals over a co-axial RF cable starting with actions that occur at a satellite Wi-Fi mesh network node or a co-axial RF signal conversion device configured to be connected to satellite Wi-Fi mesh network node, in accordance with embodiments described herein.

At 502, the system 100 receives a combined Wi-Fi computer network signal at a splitter via a second co-axial cable connection port. For example, the splitter may receive the combined Wi-Fi computer network signal output at 408 of FIG. 4.

At 504, the splitter splits the combined Wi-Fi computer network signal into a plurality of Wi-Fi computer network signals.

At 506, the system 100 transmits a respective Wi-Fi computer network signal of the plurality of Wi-Fi computer network signals to each upconverter of the plurality of Wi-Fi signal upconverters.

At 508, each upconverter of the plurality of upconverters upconverts the received respective Wi-Fi computer network signal to generate a respective up-converted Wi-Fi computer network signal. In an example embodiment, each upconverter of the plurality of upconverters to upconverts the received respective Wi-Fi computer network signal to a frequency equal to a frequency of the respective Wi-Fi computer network signals provided to each downconverter. In various embodiments, each upconverter of the plurality of upconverters to upconverts the received respective Wi-Fi computer network signal to one of: 2.4 GHz, 5 GHz or 6 GHz.

At 510, the system 100 outputs each respective up-converted Wi-Fi computer network signal to a respective antenna of the plurality of satellite Wi-Fi mesh network node antennas. In an example embodiment, the number of antennas in the plurality of central Wi-Fi mesh network node antennas is equal to the number of antennas in the plurality of satellite Wi-Fi mesh network node antennas.

At 512, the system 100 wirelessly transmits each respective up-converted Wi-Fi computer network signal from the respective antenna at which the respective up-converted Wi-Fi computer network signal was received.

Figure 6B:
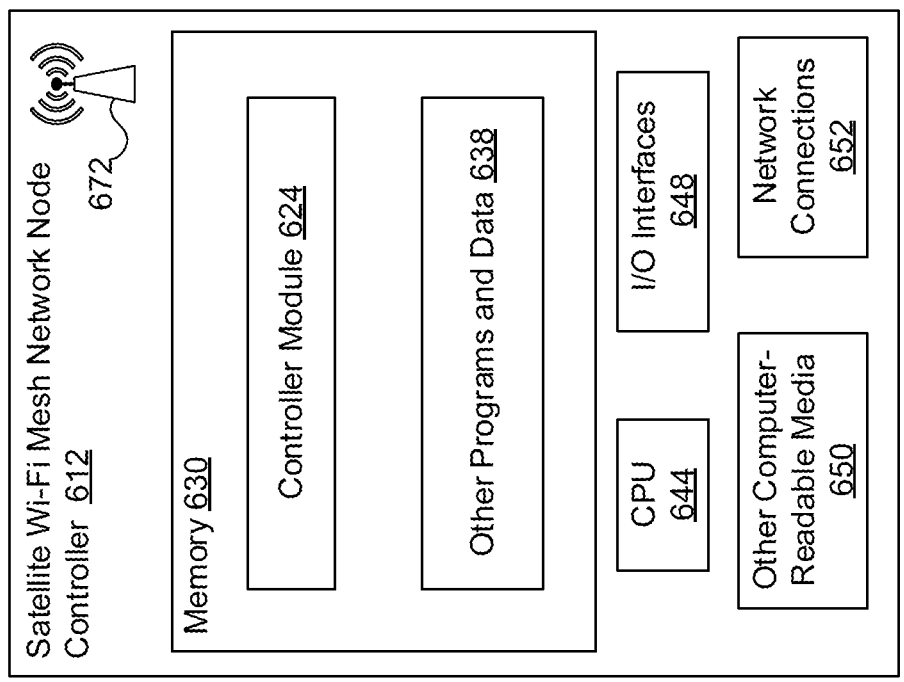
FIGS. 6A and 6B show system block diagrams that describe various implementations of computing systems for implementing embodiments described herein.
Figure 6A:
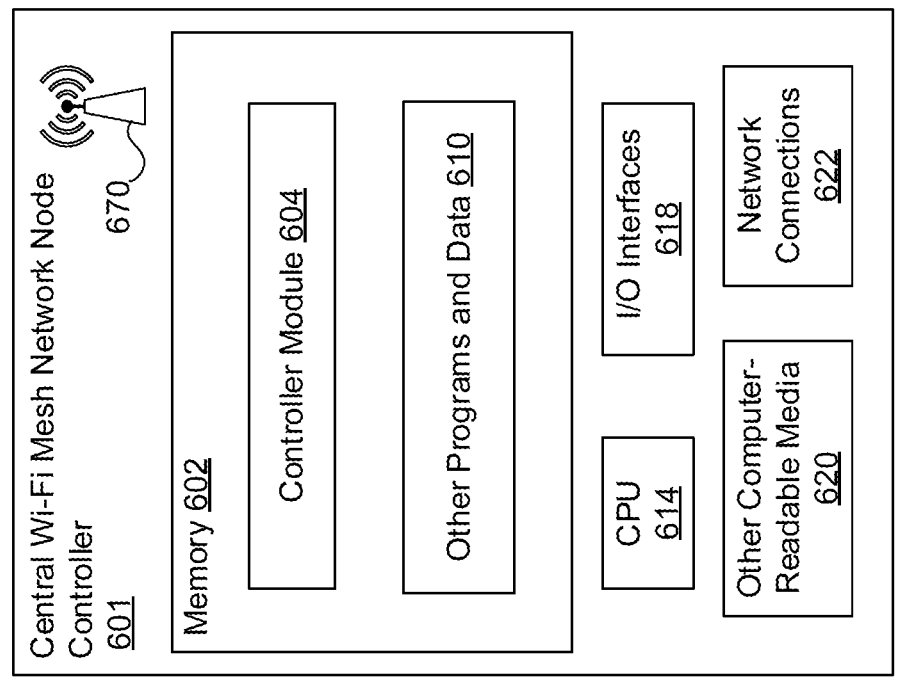

FIGS. 6A and 6B show system block diagrams that describe various implementations of computing systems for implementing embodiments described herein.

The central Wi-Fi mesh network node 202 and the central Wi-Fi mesh network node controller 204, the satellite Wi-Fi mesh network node 234 and the satellite Wi-Fi mesh network node controller 230, the Wi-Fi signal conversion device 318 and the co-axial RF cable signal conversion device 320, may be implemented using respective underlying computing systems, examples of which are respectively shown in FIG. 6A as central Wi-Fi mesh network node controller 601 and FIG. 6B as satellite Wi-Fi mesh network node controller 612.

In some embodiments, one or more special-purpose computing systems may be used to implement central Wi-Fi mesh network node controller 601. Accordingly, various embodiments described herein may be implemented in software, hardware, firmware, or in some combination thereof. The central Wi-Fi mesh network node controller 601 may include memory 602, one or more central processing units (CPUs) 614, I/O interfaces 618, other computer-readable media 620, and network connections 622. The central Wi-Fi mesh network node controller 601 may also include or be operatively connected to a plurality of antennas 670, which may correspond to antennas 114 in FIG. 1, for example.

Memory 602 may include one or more various types of non-volatile and/or volatile storage technologies. Examples of memory 602 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 602 may be utilized to store information, including computer-readable instructions that are utilized by CPU 614 to perform actions, including those of embodiments described herein.

Memory 602 may have stored thereon controller module 604. The controller module 604 is configured to implement and/or perform some or all of the functions of the central Wi-Fi mesh network node 101 or central Wi-Fi mesh network node 202, including those of a central Wi-Fi mesh network node. Memory 602 may also store other programs and data 610, which may include network protocols, network operating rules, user interfaces, operating systems, etc.

Network connections 622 are configured to communicate with other computing devices and to facilitate the operations described herein. In various embodiments, the network connections 622 include transmitters and receivers, corresponding Wi-Fi chipsets, and physical network ports including those described herein to send and receive signals and data as described herein, and to send and receive instructions, commands and data to implement the processes described herein. I/O interfaces 618 may include video interfaces, radio link interfaces, other data input or output interfaces, connection ports including those described herein, or the like. Other computer-readable media 620 may include other types of stationary or removable computer-readable media, such as removable flash drives, external hard drives, or the like.

In some embodiments, one or more special-purpose computing systems may be used to implement satellite Wi-Fi mesh network node controller 612. Accordingly, various embodiments described herein may be implemented in software, hardware, firmware, or in some combination thereof. Satellite Wi-Fi mesh network node controller 612 is an example of a computer system that may be used to implement satellite Wi-Fi mesh network node 126, satellite Wi-Fi mesh network node 234 and/or co-axial RF cable signal conversion device 320. Computer system(s) 612 may include memory 630, one or more central processing units (CPUs) 644, I/O interfaces 648, other computer-readable media 650, and network connections 652. The satellite Wi-Fi mesh network node controller 612 may also include or be operatively connected to a plurality of antennas 672, which may correspond to antennas 128 in FIG. 1, for example.

Memory 630 may include one or more various types of non-volatile and/or volatile storage technologies similar to memory 602. Memory 630 may be utilized to store information, including computer-readable instructions that are utilized by CPU 644 to perform actions, including embodiments described herein of satellite Wi-Fi mesh network node 126, satellite Wi-Fi mesh network node 234 and/or co-axial RF cable signal conversion device 320.

Memory 630 may have stored thereon controller module 624. The controller module 624 is configured to implement and/or perform some or all of the functions of the satellite Wi-Fi mesh network node 126, satellite Wi-Fi mesh network node 234 and/or co-axial RF cable signal conversion device 320 described herein and interface with central Wi-Fi mesh network node 102, central Wi-Fi mesh network node 202, the central Wi-Fi mesh network node controller 204, and/or the Wi-Fi signal conversion device 318. Memory 602 may also store other programs and data 638, which may include, network protocols, network operating rules, user interfaces, operating systems, etc.

Network connections 652 are configured to communicate with other computing devices and to facilitate operations described herein. In various embodiments, the network connections 652 include transmitters and receivers, Wi-Fi chipsets, and physical network ports as described herein to send and receive data as described herein, and to send and receive instructions, commands and data to implement the processes described herein. I/O interfaces 648 may include video interfaces, radio link interfaces, other data input or output interfaces, or the like. Other computer-readable media 650 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for transmitting Wi-Fi signals over a co-axial radio frequency (RF) cable, the system comprising:
    a central Wi-Fi mesh network node of a Wi-Fi local area network (LAN), the central Wi-Fi mesh network node including:
        a plurality of central Wi-Fi mesh network node antennas;
        a plurality of Wi-Fi signal downconverters, in which each Wi-Fi signal downconverter of the plurality of Wi-Fi signal downconverters is coupled to a respective central Wi-Fi mesh network node antenna of the plurality of central Wi-Fi mesh network node antennas;
        a Wi-Fi signal combiner coupled to the plurality of Wi-Fi signal downconverters, wherein the Wi-Fi signal combiner has a first co-axial cable connection port that is configured to be operably coupled to the co-axial RF cable;
        at least one central Wi-Fi mesh network node memory that stores central Wi-Fi mesh network node computer instructions; and
        at least one central Wi-Fi mesh network node processor that executes the central Wi-Fi mesh network node computer instructions to cause actions to be performed, the actions including:
            providing respective Wi-Fi computer network signals to each downconverter of the plurality of downconverters;
            causing each downconverter of the plurality of downconverters to downconvert the respective Wi-Fi computer network signal to a frequency that can be transmitted on the co-axial RF cable and received by a satellite Wi-Fi mesh network node of the Wi-Fi LAN via the co-axial RF cable;
            causing the combiner to combine each of the downconverted respective Wi-Fi computer network signals for transmission on the co-axial RF cable as a combined Wi-Fi computer network signal to be received by the satellite Wi-Fi mesh network node via the co-axial RF cable; and outputting the combined Wi-Fi computer network signal via the first coaxial cable connection port to be received by the satellite Wi-Fi mesh network node via the co-axial RF cable.

2. The system of claim 1, further comprising:
the satellite Wi-Fi mesh network node, the satellite Wi-Fi mesh node including:
a plurality of satellite Wi-Fi mesh network node antennas;
a plurality of Wi-Fi signal upconverters, in which each Wi-Fi signal upconverter of the plurality of Wi-Fi signal upconverters is coupled to a respective satellite Wi-Fi mesh network node antenna of the plurality of satellite Wi-Fi mesh network node antennas;
a Wi-Fi signal splitter coupled to the plurality of Wi-Fi signal upconverters, wherein the Wi-Fi signal splitter has a second co-axial cable connection port that is configured to be operably coupled to the co-axial RF cable;
at least one satellite Wi-Fi mesh network node memory that stores satellite Wi-Fi mesh network node computer instructions; and
at least one satellite Wi-Fi mesh network node processor that executes the satellite Wi-Fi mesh network node computer instructions to cause actions to be performed, the actions including:
receiving the combined Wi-Fi computer network signal at the splitter via the second co-axial cable connection port;
causing the splitter to split the combined Wi-Fi computer network signal into a plurality of Wi-Fi computer network signals and transmit a respective Wi-Fi computer network signal of the plurality of Wi-Fi computer network signals to each upconverter of the plurality of Wi-Fi signal upconverters;
causing each upconverter of the plurality of upconverters to upconvert the received respective Wi-Fi computer network signal to generate a respective up-converted Wi-Fi computer network signal;
transmitting each respective up-converted Wi-Fi computer network signal to a respective antenna of the plurality of satellite Wi-Fi mesh network node antennas; and
wirelessly transmitting each respective up-converted Wi-Fi computer network signal from the respective antenna at which the respective up-converted Wi-Fi computer network signal was received.

3. The system of claim 2, wherein the causing each downconverter of the plurality of downconverters to downconvert includes causing each downconverter of the plurality of downconverters to downconvert the respective Wi-Fi computer network signal to a frequency according to bandwidth limitations of the co-axial RF cable.

4. The system of claim 2, wherein the causing each downconverter of the plurality of downconverters to downconvert includes causing each downconverter of the plurality of downconverters to downconvert the respective Wi-Fi computer network signal from one of: 2.4 GHz, 5 GHz or 6 GHz to a frequency according to bandwidth limitations of the co-axial RF cable.

5. The system of claim 2, wherein the causing each downconverter of the plurality of downconverters to downconvert includes causing each downconverter of the plurality of downconverters to downconvert the respective Wi-Fi computer network signal to a frequency of 500 MHz.

6. The system of claim 2, wherein the causing each downconverter of the plurality of downconverters to downconvert includes causing each downconverter of the plurality of downconverters to downconvert the respective Wi-Fi computer network signal to a frequency in a range of greater than zero GHz to less than or equal to 2.1 GHz.

7. The system of claim 2, wherein the causing each downconverter of the plurality of downconverters to downconvert includes causing each downconverter of the plurality of downconverters to downconvert the respective Wi-Fi computer network signal to a frequency in a range of greater than zero GHz to less than or equal to 3 GHz.

8. The system of claim 2, wherein the causing each upconverter of the plurality of upconverters to upconvert the received respective Wi-Fi computer network signal includes causing each upconverter of the plurality of upconverters to upconvert the received respective Wi-Fi computer network signal to a frequency equal to a frequency of the respective Wi-Fi computer network signals provided to each downconverter.

9. The system of claim 2, wherein the causing each upconverter of the plurality of upconverters to upconvert the received respective Wi-Fi computer network signal includes causing each upconverter of the plurality of upconverters to upconvert the received respective Wi-Fi computer network signal to one of: 2.4 GHz, 5 GHz or 6 GHz.

10. The system of claim 2, wherein the co-axial RF cable is an RG-59 or RG-6 co-axial cable.

11. The system of claim 2, further comprising the co-axial RF cable connected to the combiner via the first co-axial cable connection port and to the splitter via the second co-axial cable connection port.

12. The system of claim 2, wherein the plurality of central Wi-Fi mesh network node antennas is two central Wi-Fi mesh network node antennas.

13. The system of claim 2, wherein the plurality of satellite Wi-Fi mesh network node antennas is two satellite Wi-Fi mesh network node antennas.

14. The system of claim 2, wherein the number of antennas in the plurality of central Wi-Fi mesh network node antennas is equal to the number of antennas in the plurality of satellite Wi-Fi mesh network node antennas.

15. The system of claim 2, wherein each Wi-Fi signal downconverter of the plurality of Wi-Fi signal downconverters includes a respective local oscillator and each Wi-Fi signal upconverter of the plurality of Wi-Fi signal upconverters includes a respective local oscillator.

16. A kit for transmitting Wi-Fi signals over a co-axial radio frequency (RF) cable, the kit comprising:
a Wi-Fi signal conversion device configured to be communicatively coupled to a central Wi-Fi mesh network node of a Wi-Fi local area network (LAN), the central Wi-Fi mesh network node including a plurality of central Wi-Fi mesh network node antennas, the Wi-Fi signal conversion device comprising:
a housing;
a plurality of Wi-Fi signal downconverters in the housing, in which each Wi-Fi signal downconverter of the plurality of Wi-Fi signal downconverters is configured to be communicatively coupled to a respective central Wi-Fi mesh network node antenna of the plurality of central Wi-Fi mesh network node antennas;
a Wi-Fi signal combiner in the housing, the Wi-Fi signal combiner configured to be coupled to the plurality of Wi-Fi signal downconverters, wherein the Wi-Fi signal combiner has a first co-axial cable connection port that is configured to be operably coupled to the co-axial RF cable;

at least one central Wi-Fi mesh network node memory in the housing that stores central Wi-Fi mesh network node computer instructions; and at least one central Wi-Fi mesh network node processor in the housing that executes the central Wi-Fi mesh network node computer instructions to cause actions to be performed, the actions including:

providing respective Wi-Fi computer network signals to each downconverter of the plurality of downconverters;

causing each downconverter of the plurality of downconverters to downconvert the respective Wi-Fi computer network signal to a frequency that can be transmitted on the co-axial RF cable and received by an RF co-axial cable signal conversion device coupled to a satellite Wi-Fi mesh network node of the Wi-Fi LAN via the co-axial RF cable;

causing the combiner to combine each of the down-converted respective Wi-Fi computer network signals for transmission on the co-axial RF cable as a combined Wi-Fi computer network signal to be received by the satellite Wi-Fi mesh network node via the co-axial RF cable; and outputting the combined Wi-Fi computer network signal via the first coaxial cable connection port to be received by the satellite Wi-Fi mesh network node via the co-axial RF cable.

17. The kit of claim 16, further comprising:

the RF co-axial cable signal conversion device configured to be communicatively coupled to the satellite Wi-Fi mesh network node, the satellite Wi-Fi mesh node including a plurality of satellite Wi-Fi mesh network node antennas, the RF co-axial cable signal conversion device comprising;

a housing;

a plurality of Wi-Fi signal upconverters in the housing, in which each Wi-Fi signal upconverter of the plurality of Wi-Fi signal upconverters is configured to be coupled to a respective satellite Wi-Fi mesh network node antenna of the plurality of satellite Wi-Fi mesh network node antennas;

a Wi-Fi signal splitter in the housing coupled to the plurality of Wi-Fi signal upconverters, wherein the Wi-Fi signal splitter has a second co-axial cable connection port that is configured to be operably coupled to the co-axial RF cable;

at least one satellite Wi-Fi mesh network node memory in the housing that stores satellite Wi-Fi mesh network node computer instructions; and at least one satellite Wi-Fi mesh network node processor in the housing that executes the satellite Wi-Fi mesh network node computer instructions to cause actions to be performed, the actions including:

receiving the combined Wi-Fi computer network signal at the splitter via the second co-axial cable connection port;

causing the splitter to split the combined Wi-Fi computer network signal into a plurality of Wi-Fi computer network signals and transmit a respective Wi-Fi computer network signal of the plurality of Wi-Fi computer network signals to each upconverter of the plurality of Wi-Fi signal upconverters;

causing each upconverter of the plurality of upconverters to upconvert the received respective Wi-Fi computer network signal to generate a respective up-converted Wi-Fi computer network signal;

transmitting each respective up-converted Wi-Fi computer network signal to a respective antenna of the plurality of satellite Wi-Fi mesh network node antennas; and wirelessly transmitting each respective up-converted Wi-Fi computer network signal from the respective antenna at which the respective up-converted Wi-Fi computer network signal was received.

18. The kit of claim 17, wherein the causing each downconverter of the plurality of downconverters to downconvert includes causing each downconverter of the plurality of downconverters to downconvert the respective Wi-Fi computer network signal from one of: 2.4 GHz, 5 GHz or 6 GHz to a frequency according to bandwidth limitations of the co-axial RF cable.

19. A method for transmitting Wi-Fi signals over a co-axial radio frequency (RF) cable, the system comprising:

receiving respective Wi-Fi computer network signals at each downconverter of a plurality of downconverters;

each downconverter of the plurality of downconverters downconverting the respective Wi-Fi computer network signal to a frequency that can be transmitted on the co-axial RF cable and received by a satellite Wi-Fi mesh network node of a Wi-Fi LAN via the co-axial RF cable;

a combiner combining each of the down-converted respective Wi-Fi computer network signals for transmission on the co-axial RF cable as a combined Wi-Fi computer network signal to be received by the satellite Wi-Fi mesh network node via the co-axial RF cable; and outputting the combined Wi-Fi computer network signal via a first coaxial cable connection port to be received by the satellite Wi-Fi mesh network node via the co-axial RF cable.

20. The method of claim 19 further comprising:

receiving the combined Wi-Fi computer network signal at a splitter via a second co-axial cable connection port;

the splitter splitting the combined Wi-Fi computer network signal into a plurality of Wi-Fi computer network signals;

transmitting a respective Wi-Fi computer network signal of the plurality of Wi-Fi computer network signals to each upconverter of a plurality of Wi-Fi signal upconverters;

each upconverter of the plurality of upconverters upconverting a received respective Wi-Fi computer network signal to generate a respective up-converted Wi-Fi computer network signal;

outputting each respective up-converted Wi-Fi computer network signal to a respective antenna of a plurality of satellite Wi-Fi mesh network node antennas; and wirelessly transmitting each respective up-converted Wi-Fi computer network signal from the respective antenna at which the respective up-converted Wi-Fi computer network signal was received.

* * * * *